Figure 1:
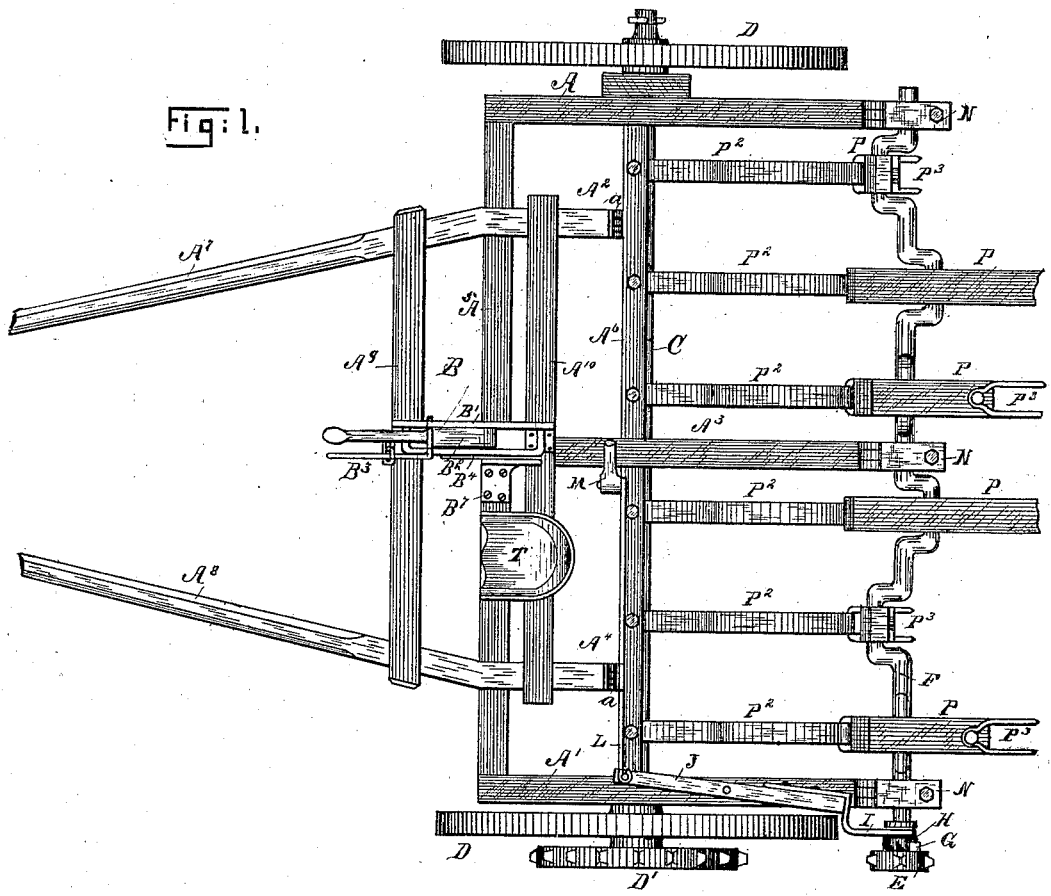

(No Model.) 2 Sheets—Sheet 1.

C. PERRIN.
COMBINED HAY RAKE AND TEDDER.

No. 311,847. Patented Feb. 3, 1885.

Witnesses:
O. M. Nichols
R. F. Brandow

Inventor.
Charles Perrin
by Emory C. Whitney
Atty (No Model.) 2 Sheets—Sheet 2.

C. PERRIN.
COMBINED HAY RAKE AND TEDDER.

No. 311,847. Patented Feb. 3, 1885.

Fig's: 4.

Witnesses:
O. M. Nichols,
R. F. Brandon.

Inventor.
Charles Perrin.
By George E. Whitney
Atty

UNITED STATES PATENT OFFICE.

CHARLES PERRIN, OF SPRINGFIELD, OHIO, ASSIGNOR OF ONE-THIRD TO DAVID H. BREWER, OF SAME PLACE.

COMBINED HAY RAKE AND TEDDER.

SPECIFICATION forming part of Letters Patent No. 311,847, dated February 3, 1885.

Application filed July 9, 1884. (No model.)

*To all whom it may concern:*

Be it known that I, CHARLES PERRIN, of the city of Springfield, county of Clark, and State of Ohio, have invented certain new and useful Improvements in Combined Hay Tedder and Rake, of which the following is a specification.

This invention relates to agricultural implements, and has special reference to hay-tedders.

The object of my invention is to provide a simple and effective agricultural machine capable of being used either as a hay tedder or a rake; also to so construct the fork-carriers of a hay-tedder that they will be automatically adjustable upon their respective cranks in the direction of their length, to thereby obviate the use of springs commonly used to connect the forks to their carriers, and to allow the forks and fork-carriers to easily ride over obstacles.

In this my invention the tedder-fork carriers are flexibly connected to the frame-work or to the axle-tree of the apparatus by means of springs, which not only serve the purpose of the rod-connections heretofore used, but allow the carriers to be moved in many positions impracticable to tedders of ordinary construction.

My invention consists in a hay-tedder having a removable crank-shaft provided with a clutch-half and a loose sprocket-wheel, adapted to be driven by a like wheel on the main shaft of the tedder, the said sprocket-wheel being provided with a lug adapted to be engaged by the clutch-half on the crank-shaft, and mechanism to throw the said clutch-half into and out of engagement with the said pawl, substantially as hereinafter described.

It also consists in the combination, with the crank-shaft of a hay-tedder, of fork-carriers adjustably connected therewith, substantially as hereinafter described.

It also consists in a hay-tedder having adjustable fork-carriers, the said fork-carriers being flexibly connected to the frame-work of the tedder by means of flat S-shaped springs, substantially as hereinafter described.

It also consists in a fork-carrier for hay-tedders having an elongated slot in the direction of its length, and provided with sliding journal-boxes to engage the crank-shaft, substantially as hereinafter described.

It also consists in a fork-carrier for hay-tedders having a flat S-shaped supporting-spring, by which it is attached to the frame-work of the tedder, substantially as hereinafter described.

It also consists in the combination, with the tedder-frame, of a rake the shaft of which is provided with a clutch-half and a loose sprocket-wheel, said clutch-half being adapted to be thrown in and out of engagement with a lug on the sprocket-wheel by means of a forked arm or other mechanism, substantially as hereinafter described.

It also consists in a crank-shaft for hay-tedders having a sprocket-wheel at its ends adapted to be driven by means of a sprocket-wheel upon the main shaft or axle of the tedder, in combination with carrier-arms slotted in the direction of their length and provided with journal-boxes to receive the said shaft, said journal-boxes sliding in said slots, and supporting-springs to connect the said carrier-arms to the frame-work of the tedder, the said slot and spring allowing the carriers and forks to ride freely over obstacles without strain upon the forks, substantially as hereinafter described.

It also consists in certain details of construction hereinafter described.

Figure 2:
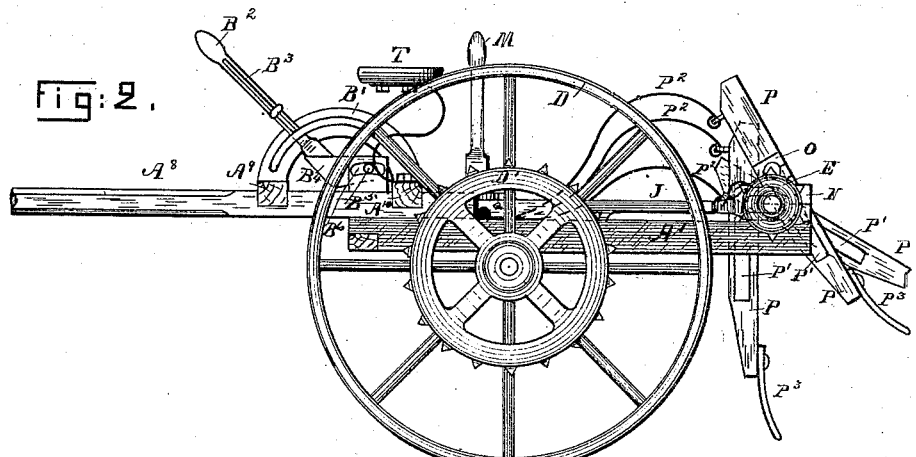
Figure 3:
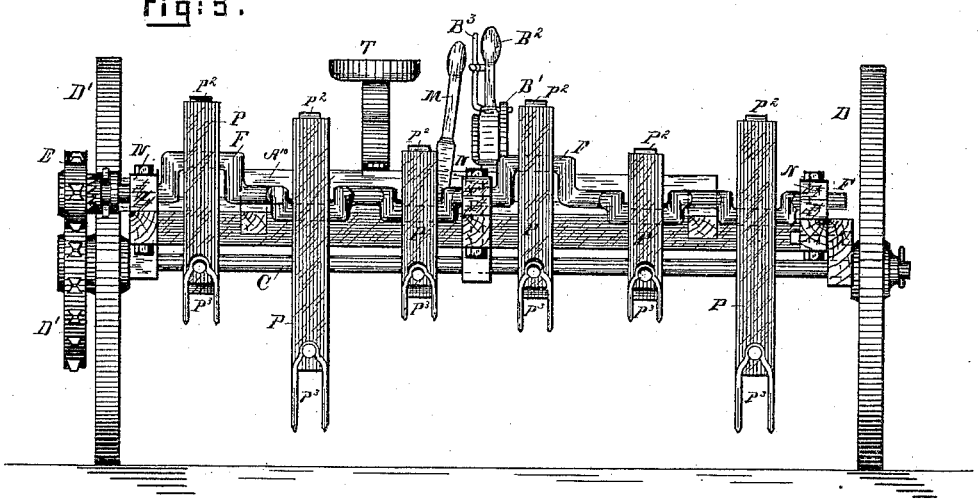
Figure 3:
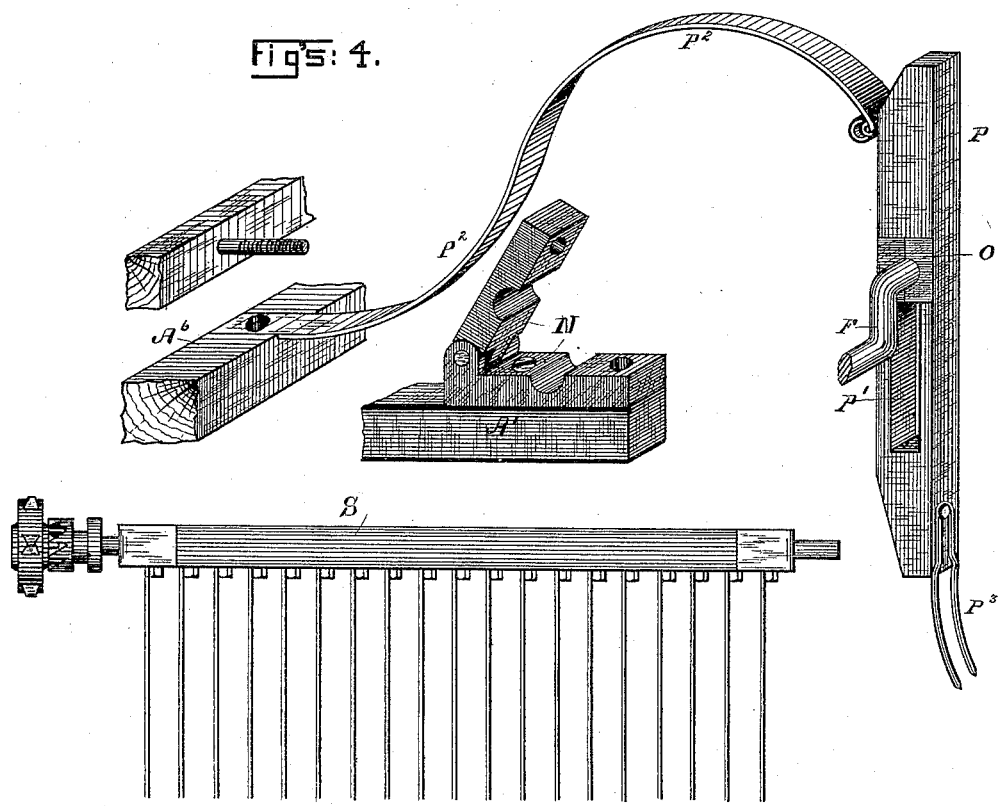

Figure 1 represents in plan view a hay-tedder constructed in accordance with my invention; Fig. 2, a side elevation of the same; Fig. 3, a rear view, and Fig. 4 details of the fork-carrier and its connections, the hinged journal-box, and the rake attachment.

The frame, which may be of any usual construction, consists of the side sills, A A', intermediate sills, A² A³ A⁴, forward or supporting sill, A⁵, axle-tree or center sill, A⁶, draft sills or shafts A⁷ A⁸, and cross-braces A⁹ A¹⁰. The draft timbers or shafts are hinged at *a* to the intermediate sills, A² A⁴. Tipping mechanism B for tipping the tedder is provided, which is and may be of usual construction, said mechanism consisting of a semicircular plate, B', attached to the cross-braces A⁹ A¹⁰, and a lever, B², provided with a spring-lock, B³, which enters holes in the plate B', said lever being provided with a plate, B⁴, at its lower end. This plate $B^4$ is provided with a projection, $B^5$, which slides in a groove, $B^6$, of a plate, $B^7$, connected with the end sill, $A^5$. The mechanism for tipping the tedder may, however, be changed without materially departing from my invention. The main portion of the tedder-frame rests upon the main axle C, which is provided at its either end with ground-wheels D.

Attached to the axle or main shaft C at one end is a sprocket-wheel, D′, which is connected to a similar sprocket-wheel, E, by means of a sprocket-chain (not shown) upon the end of the crank-shaft F. The said sprocket-wheel E is provided with a lug, G, to engage with a clutch-half, H, said sprocket-wheel E being loose upon the crank-shaft. A forked lever, I, which engages with the clutch-half H to throw the said clutch-half into and out of engagement with the lug G of the loose sprocket-wheel E, is connected to a rod, J, pivoted to the side sill, A′, which is connected at its opposite end by means of a link, L, to the hand-lever M, said hand-lever being pivoted to the axle-tree. The crank-shaft F, resting in hinged journal-bearings N, attached to the side-sills, is provided with a series of cranks, said cranks being, as usual, at different angles. Located upon the cranks, and connected therewith by sliding journal-boxes O, are fork-carriers P, said fork-carriers being provided with elongated slots P′ in the direction of their length, and being connected to the frame-work of the tedder by means of flat S-shaped supporting-springs $P^2$, connected to their upper ends, the opposite ends of the said springs being bolted to the axle-tree as shown in Fig. 4. Said fork-carriers P are provided with forks $P^3$ at their lower ends. By providing the fork-carriers with a sliding bearing for the cranks and flexibly connecting them to the frame-work, as described, I am enabled to ride them over large obstacles without injury to the machine, either forward or backward. By withdrawing the bolts connecting the springs to the frame-work and opening the hinged journal-boxes O the shaft and carriers may be quickly removed and the rake attachment put in its place. The rake will be provided, as shown in detail Fig. 4, with a shaft, S, adapted to fit the bearings provided for the crank-shaft, said shaft S being also provided with a clutch and sprocket-wheel, the shifting mechanism for the clutch being the same for both the crank-shaft and rake, it forming a permanent part of the tedder-frame.

By providing a rake attachment it enables the farmer to do with one machine what heretofore required two to do.

The seat T, attached to the cross-bar $A^{10}$, may be of any desired construction.

The crank-shaft F may be made in one or more sections, if desired.

The journal-bearings O, which slide in the slots of the fork-carriers, are herein shown as constructed in two pieces and being provided with flanges at their side edges adapted to overlap or bear upon the sides of the fork-carrier. By constructing the journal-box O in two pieces it may be more readily placed in position, and by providing it with flanges to bear upon the sides of the fork-carrier its tendency to become displaced is obviated.

I claim—

1. The combination, with the hay-tedder frame and its crank-shaft, of fork-carriers connected to the cranks on said shaft and flexibly connected to the frame of the tedder by means of flat springs, preferably S-shaped, as shown, and for the purpose described.

2. A hay-tedder having fork-carriers flexibly connected to the frame of the tedder by means of flat S-shaped springs, whereby the fork-carriers are adapted to yield to obstructions, substantially as described.

3. In a hay-tedder, the combination, with the actuating-crank, of a fork-carrier having the elongated slot P′ in the direction of its length, provided with the sliding journal-box O, constructed, as shown, in two pieces, and provided with flanges to bear against the sides of the fork-carrier, substantially as described.

4. A fork-carrier for hay-tedders, provided with a flat S-shaped spring, by which it is directly connected to the frame of the tedder, said spring being constructed in the manner described, so as to support the carrier and relieve it from jars or strains while passing obstacles, substantially as set forth.

5. The combination, with the main frame provided with journal-boxes N, of the crank-shaft F, journaled in said boxes, and the slotted fork-carriers yieldingly connected to the frame-work of the tedder by means of flat S-shaped springs, substantially as described.

6. The combination, with the tedder-frame, of a detachable rake-head provided with a clutch and pulley or sprocket-wheel adapted to be actuated by the pulley or sprocket-wheel on the main axle of the tedder, and mechanism, as described, attached to the frame of the tedder to operate said clutch, as and for the purpose set forth.

In witness whereof I have hereunto set my hand and seal, at Springfield, Ohio, this 30th day of June, A. D. 1884.

CHARLES PERRIN. [L. S.]

In presence of—
P. J. CLEVENGER,
N. E. C. WHITNEY.

It is hereby certified that in Letters Patent No. 311,847, granted February 3, 1885, upon the application of Charles Perrin, of Springfield, Ohio, for an improvement in "Combined Hay Rake and Tedder," the name of the assignee of one-third interest therein was incorrectly written and printed "David H. Brewer," whereas it should have been written and printed *David W. Brewer;* that the proper corrections have been made in the files and records pertaining to the case in the Patent Office and should be read in the Letters Patent that the same may conform thereto.

Signed, countersigned, and sealed this 21st day of April, A. D. 1885.

[SEAL.] H. L. MULDROW,
*Acting Secretary of the Interior.*

Countersigned:
    M. V. MONTGOMERY,
        *Commissioner of Patents.*